United States Patent [19]

Barnard

[11] Patent Number: 5,140,489
[45] Date of Patent: Aug. 18, 1992

[54] DISK CARTRIDGE ADAPTED FOR USE WITH DIFFERENT DISK DRIVES

[75] Inventor: James A. Barnard, Conesus, N.Y.

[73] Assignee: Eastman Kodak Company, Rochester, N.Y.

[21] Appl. No.: 430,695

[22] Filed: Oct. 30, 1989

[51] Int. Cl.$^5$ .............................................. G11B 23/03
[52] U.S. Cl. ................................. 360/133; 360/97.01; 369/291; 369/77.2; 206/312
[58] Field of Search .................. 360/133, 97.01, 99.06, 360/99.02; 369/291, 261, 270, 271, 77.2, 292; 206/444, 312, 316

[56] References Cited

U.S. PATENT DOCUMENTS 4,817,079  3/1989  Covington .................... 360/133 X
4,821,124  4/1989  Tamaru .......................... 360/133

FOREIGN PATENT DOCUMENTS 0124174  5/1989  Japan ............................ 360/133

Primary Examiner—Andrew L. Sniezek
Attorney, Agent, or Firm—William W. Holloway

[57] ABSTRACT

A protective cartridge for a data storage disk (e.g. optical, magneto-optical and magnetic disks) has two disk-access apertures which enable the disk to be used with two different types of disk drives, i.e. those which extract the disk from the cartridge prior to a record-/playback operation, and those which record/playback information on the disk while rotating the disk within the cartridge. One aperture is provided in a side wall of the cartridge and is sized to allow a disk to be inserted into or extracted from the cartridge interior, and the other aperture is provided in the top and/or bottom wall(s) of the cartridge to expose a sufficient portion of the disk to enable it to be rotated within the cartridge and to have data recorded or played back over its entire data-recording surface(s). Two different cartridge doors prevent dirt and other contaminants from entering the cartridge interior through the disk-access apertures.

8 Claims, 5 Drawing Sheets

DISK CARTRIDGE ADAPTED FOR USE WITH DIFFERENT DISK DRIVES

BACKGROUND OF THE INVENTION

This invention relates to the field of data recording and playback. More particularly, it relates to improvements in protective cartridges used to house data storage disks, such as optical, magneto-optical and magnetic disks.

Most conventional high density recording systems use data storage disks to store vast quantities of information in binary form. Owing to the high packing density of the stored bits of information, it is essential that the data-recording surfaces of these disks be protected from dirt, dust and other debris which can either obscure recorded bits or interfere with the recording of such bits. A variety of protective enclosures, referred to in the art as "cases," "cassettes," "cartridges," "caddies," etc., have been designed with this purpose in mind. The structural design and appearance of these cartridges is usually determined by the features of the disk drive units in which they are to be used. For example:

U.S. Pat. No. 4,433,410 (Siryi et al) discloses an optical disk cartridge which is intended for use in a disk drive unit of the type which includes means for rotating the disk within the cartridge. The cartridge comprises a plurality of spring loaded fingers which engage the rim of the disk and prevent the information-bearing surfaces from touching the inside surfaces of the cartridge. Upon being engaged by certain "pins" in the disk drive unit, the spring-loaded fingers are separated from the disk rim, thereby allowing the disk to rotate within the cartridge. A central circular aperture formed in the cartridge allows a spindle to engage the disk for rotation, and a radially extending slot or window allows an optical transducer to access all of the information tracks as the disk rotates.

In the commonly assigned U.S. Pat. No. 4,853,926 (Covington et al), a data storage disk is protectively packaged by a caddy/carrier assembly. The caddy is merely a temporary container for the disk during periods of non-use. The carrier comprises a rectangular frame which fits within the caddy and serves to support the disk at several locations along the disk's rim. A side wall of the caddy is provided with a pair of spring-loaded doors through which a disk-extracting mechanism of a suitable disk drive unit can enter and extract the disk/carrier assembly for utilization. Upon removing the disk/carrier assembly from the caddy, the disk is released from the carrier frame (by another disk drive mechanism), and the disk is loaded onto a spindle for rotation. After use, the disk is returned to the carrier frame, and the disk/carrier assembly is returned to the protective caddy through the caddy doors.

From the foregoing, it may be appreciated that the protective package surrounding a data storage disk determines the type of disk drive unit with which it can be used. Certainly, disks housed by cartridges of the type disclosed by Siryi et al cannot be used in the disk drive units designed to accept the Covington et al carrier/caddy assembly, and vice versa.

SUMMARY OF THE INVENTION

In view of the foregoing, it is an object of this invention to provide a more versatile data storage disk cartridge, one which may be used with disk drive units adapted to remove a disk contained by the cartridge prior to rotating the disk on a drive spindle, as well as one which may be used with disk drive units adapted to rotate the disk within the confines of the cartridge.

The disk cartridge of the invention basically comprises a disk enclosure having two disk-access apertures, one for enabling a disk to be selectively inserted into and extracted from the disk enclosure, and the other for enabling access to the disk within the enclosure so that the disk may be rotatably driven within the disk enclosure and have information recorded and/or played back on all information tracks. Preferably, a pair of spring-loaded doors, one selectively covering each of the cartridge apertures, serve to maintain a dirt-free environment within the cartridge interior.

The invention and its various advantages will become more apparent to those skilled in the art from the ensuing detailed description of a preferred embodiment, reference being made to the accompanying drawings.

DETAILED DESCRIPTION OF PREFERRED EMBODIMENTS

Figure 1:
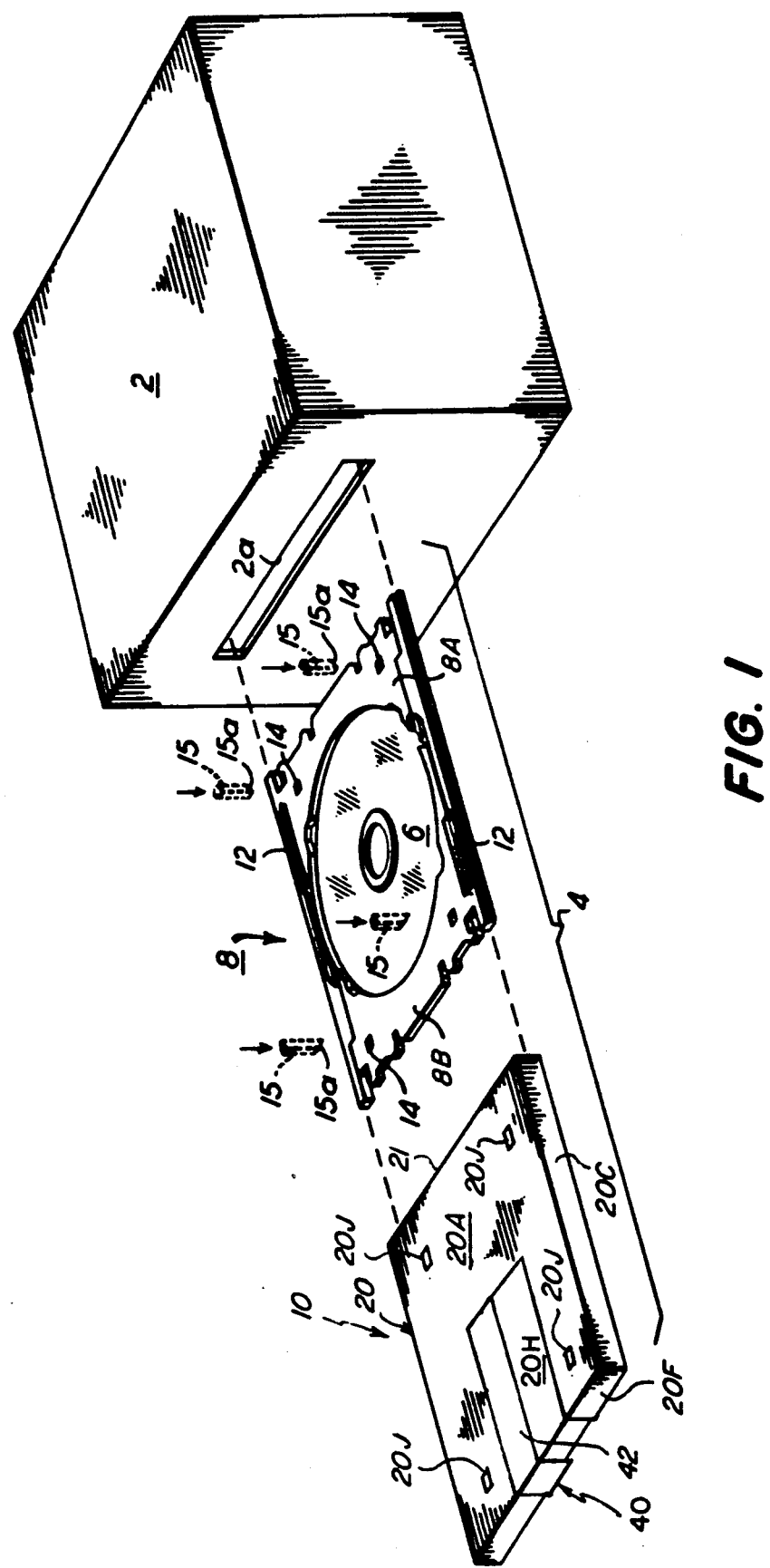
FIG. 1 is a perspective illustration of a data recording/playback system embodying the disk cartridge of the invention.

Referring now to the drawings, FIG. 1 illustrates a data recording/playback system comprising a disk drive unit 2 and a data storage disk assembly 4. The latter basically comprises a rigid data storage disk 6, a disk carrier 8 and a protective cartridge 10. The particular disk carrier shown is that described in the commonly assigned U.S. Pat. No. 4,817,079 to R. G. Covington. As explained in that patent, disk carrier 8 serves to releasably capture disk 6 so that the disk is accurately and securely registered within the carrier structure, yet is capable of being readily released from the carrier for rotation. When not in use, the carrier and its captured disk are positioned within cartridge 10, whose structural details as described below, constitute the subject matter of this invention.

Figure 2A:
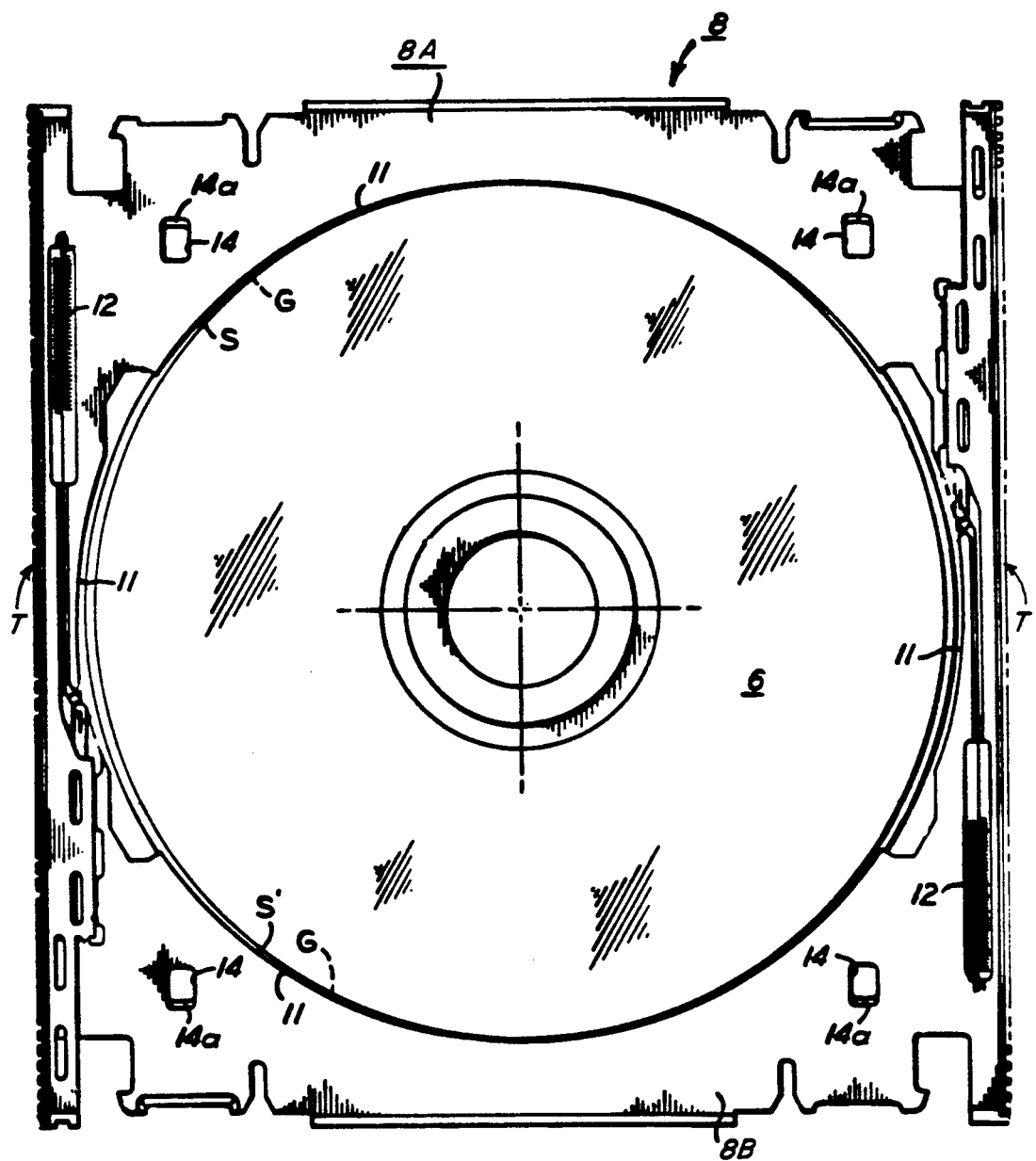
FIGS. 2A and 2B are top plan views of a data storage disk and carrier therefor.
Figure 2B:
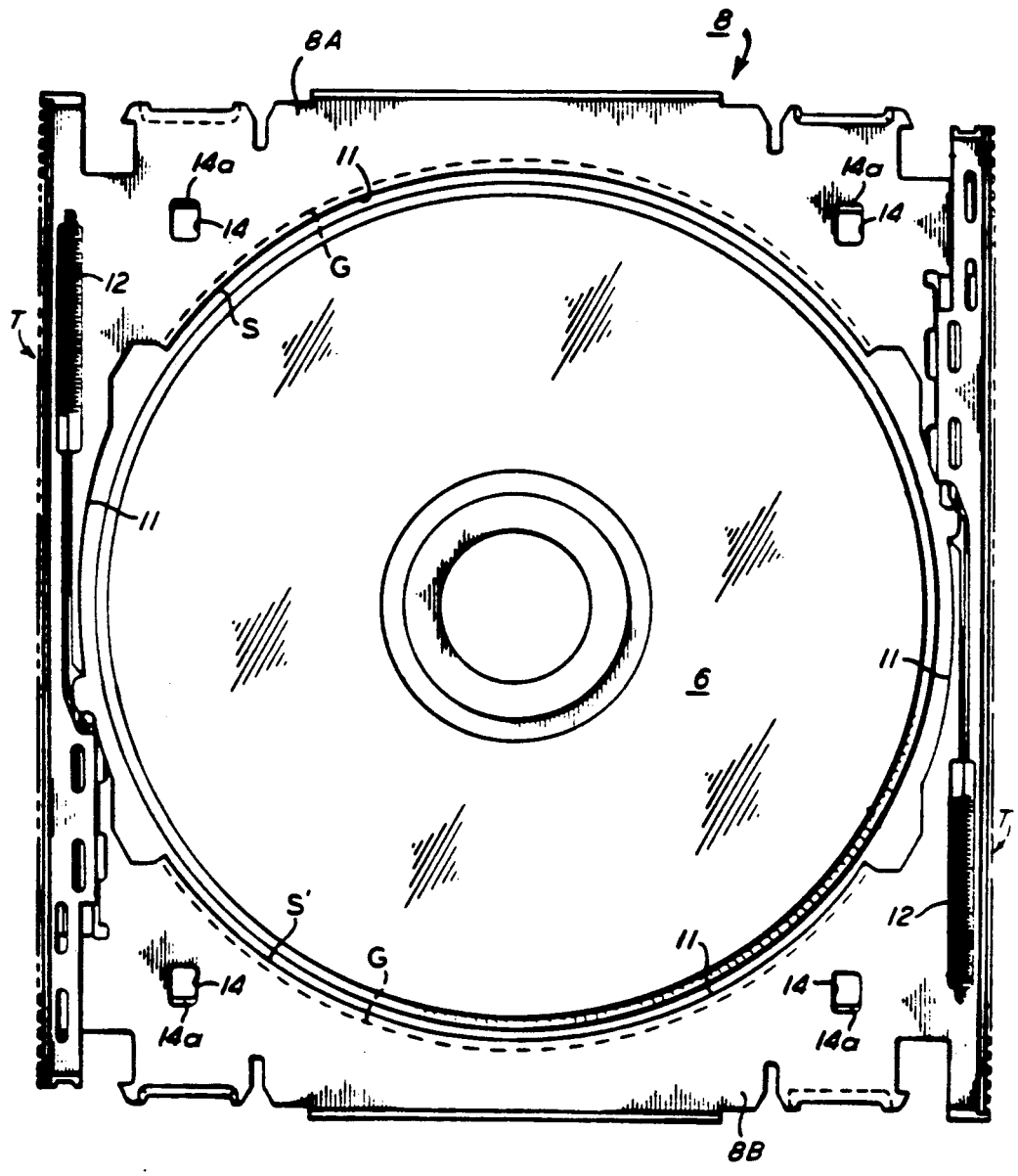

Referring additionally to FIGS. 2A and 2B, disk carrier 8 basically comprises a pair of crescent-shaped frame members 8A, 8B having arcuate surfaces S, S', respectively, which cooperate to define a generally circular aperture 11 for receiving data storage disk 6. As explained in the aforementioned Covington patent, the crescent-shaped frame members are slidably connected by a tongue groove arrangement T so that the size of the circular aperture can be varied. By this arrangement, a data storage disk can be captured within the aperture when the frame members are relatively close together, as shown in FIG. 2A, and released from the aperture when the frame members are relatively far apart, as shown in FIG. 2B. A pair of coil springs 12 serve to resiliently urge the frame members toward each other, i.e., toward disk-capturing positions. Capture of a disk within aperture 11 is effected by a pair of grooves G formed in arcuate surfaces S, S'. Each carrier frame member is provided with a structure which facilitates movement of the frame members apart to enable release of the disk for use. In the carrier shown, such structure comprises a plurality of rectangular apertures 14, each having a bevelled edge 14A which is adapted to be engaged by a like plurality of release pins 15, shown in FIG. 1, the latter being a part of the disk drive unit. The interaction of such release pins and apertures to effect disk release is fully described in the aforementioned Covington patent. Briefly, however, downward movement of the release pins into apertures 14 causes cam surfaces 15A to engage the bevelled edges 14A of apertures 14. As the release pins move through these apertures, cam surfaces 15a exert lateral forces on the frame members, thereby tending to move such members apart against the biasing forces provided by springs 12.

Figure 3A:
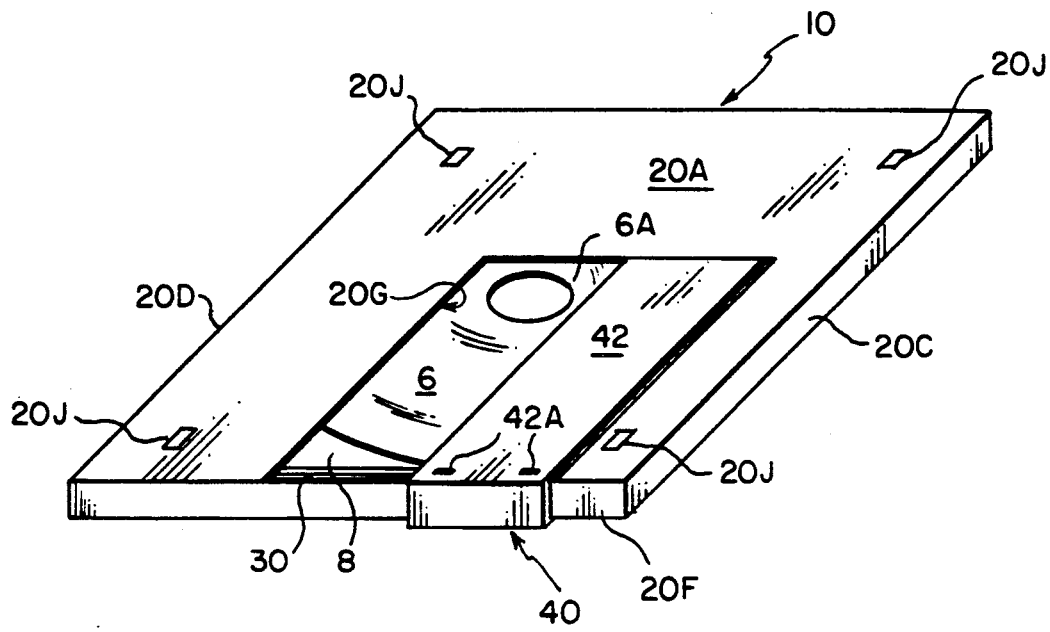
FIGS. 3A and 3B are perspective views, from different viewpoints, of a preferred disk cartridge.
Figure 3B:
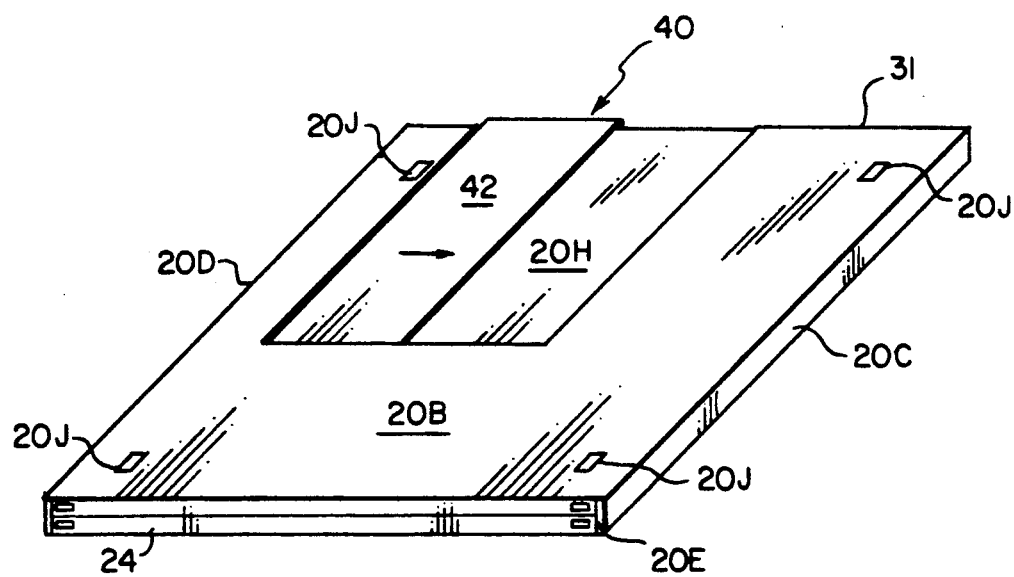
Figure 4:
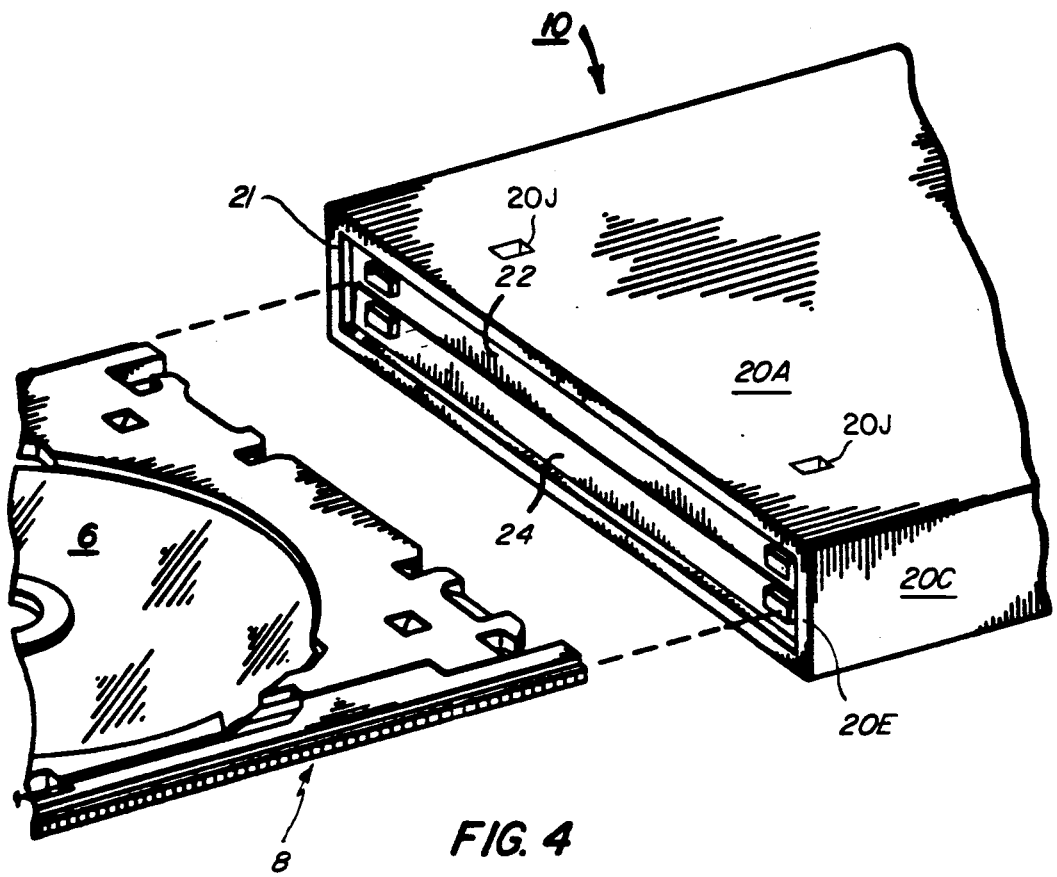
FIG. 4 is an enlarged perspective view showing a pair of cartridge doors in their closed position.

As indicated above, disk cartridge 10 is specially designed to accommodate a disk/carrier assembly of the type shown in the drawings. It will be appreciated, however, that the cartridge may take different forms depending, for example, on the shape of the disk carrier or on the peculiarities and structural features of the disk drive unit. Generally, however, cartridge 10 comprises a box-like container which, as shown in FIGS. 3A and 3B, includes confronting and coextensive top and bottom walls, 20A and 20B, respectively, and a plurality of spaced, parallel side walls, 20C, 20D, 20E and 20F. Side wall 20E has an opening 21 (FIG. 5) through which the disk/carrier assembly can enter and exit from the cartridge interior. By virtue of this opening, the cartridge is adapted for use with disk drive units of the type disclosed in the U.S. Pat. No. 4,773,058, i.e., disk drive units including a mechanism designed to withdraw a disk/carrier assembly through the end of a cartridge prior to use, and to return such assembly to the cartridge after use. A pair of spring-loaded doors 22, 24, arranged in cartridge opening 21, serve to keep dirt and debris from the cartridge interior. As described more thoroughly in the above-mentioned Covington patent, doors 22, 24 are pivotally mounted on shafts 26, 28, respectively, which span between the cartridge side walls 20C and 20D. Torsion springs (not shown) serve to urge these doors toward their cartridge-closing positions, as shown in FIGS. 3B and 4.

To enable cartridge 10 to be used in disk drive units of the type in which the disk is rotated within the cartridge, a second disk-access door 40 is provided. Door 40, which is best shown in FIGS. 3A and 3B, comprises a U-shaped member 42 which wraps around the cartridge's side wall 20F. Door member 42 is slidably mounted in a cartridge indentation 20H (formed in top and bottom sides 20A and 2B) for movement between a closed position, shown in FIGS. 1 and 3B, and an open position, shown in FIG. 3A. Spring means (not shown) serve to urge door member 42 towards its closed position, and a pair of inwardly extending tabs 42A on door member 42 slidably engage a groove 30 in cartridge top wall 20A to control the direction of movement of the member 42 relative to the cartridge. In its closed position, the respective legs of the U-shaped door member 42 entirely cover slotted openings 20G formed in cartridge's top and bottom walls. That is, opening 20G extends through the cartridge so that, when door member 42 is in its open position (as shown in FIG. 3A), both sides of the cartridge-enclosed disk are exposed. Opening 20G is sized so as to expose all of the disk's data tracks along a radius defined by the door. Moreover, opening 20G is sufficiently large to expose the disk's central aperture 6A, thereby allowing access to the disk by a rotatably driven spindle of a disk drive unit.

Figure 5:
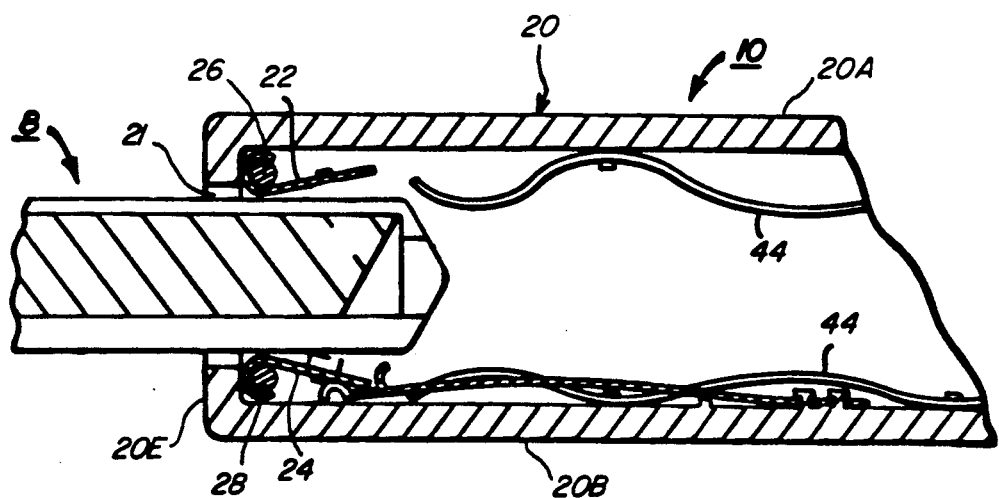
FIG. 5 is a cross-sectional illustration showing the cartridge doors of FIG. 4 in an open position.

When cartridge 10 is used to house a disk carrier 8 of the type described above, it is necessary to provide a means for releasing the disk from the carrier so that it may be rotated within the cartridge. Such means for achieving this function takes the form of a plurality of apertures 20J passing through the top and bottom walls of the cartridge, such apertures aligning with the disk carrier release apertures 14. Disk-release pins associated with the disk drive unit enter apertures 20J and 14 and function to spread the carrier halves 8A and 8B apart, thereby releasing the disk for rotation within the cartridge interior. As shown in FIG. 5, a plurality of corregated resilient strips 44 serve to assure that the carrier is retained at a position equally spaced from the cartridge's top and bottom walls. Such strips slidably engage the disk carrier as it enters and exists the cartridge.

While the preferred cartridge of the invention is adapted to house a disk/carrier assembly of the type described, it will be apparent that the carrier component of this assembly could be eliminated, i.e., the disk would be loosely contained by the cartridge. In this case, it is still preferred that the cartridge interior be modified to achieve the function of the carrier, e.g., by including releasable fingers for centering the disk within the cartridge interior. Also, while the slotted openings 20 in the cartridge's top and bottom walls are disclosed as being continuous openings spanning the spacing between the disk's central aperture 6A and the disk periphery, it may be desirable, from a structural standpoint, to provide a plurality of discrete openings in these walls, such as a circular opening concentric with disk aperture 6A, and a radially-extending narrow slot which only exposes a radially-extending strip on the disk surface, a strip just wide enough to enable access to the data tracks by a record/playback transducer. Preferably, all such apertures are covered by door member 42 whenever the disk is not being used within the cartridge.

The invention has been described in detail with particular reference to preferred embodiments thereof, but it will be understood that variations and modifications can be effected within the spirit and scope of the invention.

What is claimed is:

1. A cartridge system for a data storage disk of the type used in disk recorder/player apparatus having rotatably driven spindle for rotating a disk relative to a record/playback transducer, said cartridge system used with first disk recorder/player apparatus in which said data storage disk is extracted from said cartridge system prior to record/playback operations and used with second disk recorder/player apparatus in which record/playback operations are performed with a data storage disk in said cartridge system, said cartridge system comprising:

a) a plurality of disk retaining members for releasably engaging a data storage disk, said plurality of retaining members releasing said disk in response to a release force exerted by a release element of a first recorder/player apparatus, said released disk being engaged by said rotatably driven spindle;

b) wall means defining an enclosure for said disk retaining members, said wall means including a pair of relatively closely spaced and confronting planar walls spaced apart by a plurality of perpendicularly extending side walls, said wall means further including a securing unit mounted within said wall means for securing plurality of disk retaining members in a predetermined position, said wall means including at least one opening for insertion therein of a release element from a second disk recorder/player apparatus, insertion of said release element by said second recorder/player apparatus causing a release force to be applied to said plurality of disk retaining members when said plurality of disk retaining members are located within said wall means in said predetermined position, one of said side walls having an elongated opening for enabling said plurality of disk retaining members to be inserted into and extracted from said enclosure by a first disk recorder/player apparatus, at least one of said planar walls having an aperture therein, said aperture and said plurality of disk retaining members structured to expose a central portion of a disk positioned within said plurality of disk retaining members, exposure of said disk central portion enabling said rotatably driven spindle of a second recorder/player apparatus to engage and rotate said data storage disk while said data storage disk is located within said enclosure and said release force are caused by said release element of said second recorder/player apparatus is exerted on said plurality of disk retaining members, said aperture and said plurality of disk retaining members also exposing a radially extending strip on such disk to enable recording/playback of data on such disk by a second recorder/player apparatus when said release force is exerted thereon by said release element of said second recorder/player apparatus; and c) first and second protective door means movably mounted on said wall means for selectively covering said elongated opening and said aperture, respectively when said cartridge system is removed from a second disk player/recorder, apparatus said securing unit releasing said plurality of disk retaining members when said first door means is opened by said first disk recorder/player apparatus.

2. The cartridge system of claim 1 wherein said first disk recorder/player apparatus can apply said release force directly to said plurality of disk retaining members positioned within said first recorder/player apparatus in an absence of said wall means, and wherein said second recorder/player apparatus can apply said release force directly to said plurality of disk retaining members through an opening in said wall means when said explosure is positioned within said second recorder/player apparatus.

3. A cartridge for a data storage disk of the type having a central aperture engaged by a rotatably driven spindle of a disk drive unit and a plurality of substantially concentric data tracks surrounding said aperture, wherein said disk is releasably secured in a restraining structure, said cartridge used both in disk drive units of a first type in which a disk is extracted prior to a record/playback operation and to be used in disk drive units of a second type in which a disk is rotated within a cartridge in a record/playback operation, said cartridge comprising:

wall means defining a disk enclosure having spaced first and second walls connected by side walls, one of said side walls defining a first disk-access aperture through which a data storage disk and said restraining structure can be inserted into and be extracted from said enclosure by a first disk drive unit, of said first type said first wall defining a second disk-access aperture through which a central aperture of a disk located within said enclosure can be engaged by such rotatably driven spindle and all of such data tracks can be accessed by a record/playback transducer of a second disk drive unit of said second type, said wall means further including a positioning structure for releasably positioning said disk restraining structure in said enclosure, said positioning structure engaging said disk restraining structure and said storage disk in a predetermined position when inserted into said second disk drive unit, said wall means further including openings permitting said second disk drive unit to apply corresponding release elements to said disk restraining structure to release said data storage disk in said predetermined position, wherein a storage disk released from said restraining structure engages said spindle and interacts with said record/playback transducer of said second disk drive unit; and first and second door means movably mounted on said wall means for closing said first and second disk-access apertures, respectively, when said cartridge is removed from said second disk drive unit, wherein said positioning structure is coupled to said first door means and releases said restraining structure when said first door means is opened by said first disk drive unit and said first disk drive unit having a release element which applies a release force to said restraining structure to allow said data storage disk to rotate.

4. The cartridge defined by claim 3 wherein said first door means comprises a pair of door members pivotally mounted on said one side wall.

5. The cartridge defined by claim 4 wherein said first door means further comprises means for biasing said door members toward a position in which they cooperate in covering said first disk-access aperture.

6. The cartridge as defined by claim 3 wherein said second door means comprises a door member slidably mounted on said wall means.

7. The disk cartridge as defined by claim 6 wherein said second door means comprises a U-shaped, slidably mounted door which is movable between aperture-covering and aperture-exposing positions, and spring means for biasing said second door means toward its aperture-covering position.

8. The disk cartridge defined by claim 3 wherein said restraining structure for said data storage disk includes a plurality of movable disk-retaining members, said data storage disk being releasably retained within said cartridge by said plurality of movable disk-retaining members, and wherein said members can be accessed through said openings by a disk-releasing mechanism of a second disk drive unit and moved from disk-retaining to disk-releasing positions, whereby such disk can be rotatably driven within said disk enclosure.

* * * * *